Aug. 12, 1941.  A. KLAMMT  2,252,430

COMPOSITE FLOORING PRODUCT

Filed July 23, 1938

INVENTOR
ARTHUR KLAMMT
BY
ATTORNEYS

Patented Aug. 12, 1941

2,252,430

UNITED STATES PATENT OFFICE 2,252,430

COMPOSITE FLOORING PRODUCT

Arthur Klammt, New York, N. Y., assignor to W. M. Ritter Lumber Company, a corporation of West Virginia Application July 23, 1938, Serial No. 220,845

6 Claims. (Cl. 20—8)

The present invention pertains to improvements in composite flooring products, and has for an object the provision of a composite block or section of flooring in which the individual slats are held together by spots or strips of permanently flexible adhesive material, the union being of sufficient strength to allow shipping and handling without separation of the members.

Another object is to provide a composite block or section composed of individual slats in which the members are held together in normal relationship by spots or short strips of a cementing material sufficiently elastic to allow flexing of the composite without danger of breakage at the points of union.

Another object is to provide a composite block or section comprising single strips of flooring held together in a non-rigid structure by spots or strips of permanently flexible adhesive, such adhesive being enclosed in the joints between said strips in a manner which will prevent any of the materials of the adhesive from bleeding into finishing materials.

Another object is to provide a composite structure from individual members of tongue and groove construction held together by spots or strips of flexible adhesive material, the volume and location of the adhesive being such as to prevent any interference with the normal fit of the tongue and groove.

Other objects and advantages of the invention will appear during the course of the following description in connection with the accompanying drawing, in which—

It is obvious that where a floor is made up of small individual pieces, there is a distinct advantage in using grouped members if they can be so grouped as to not interfere with some preconceived design or cause a balance of the labor saving by costs incident to breakage in transit or separation of the members during handling.

Many methods have been advanced for uniting individual members to form a composite section suitable for use in laying floors. In most of these methods a rigid structure is produced which is not good practice because these rigid sections when joined over a slightly uneven base will cause a strain at the joints unless an excess of plastic cement is used on the base to adjust for its irregularities.

Another undesirable feature of many of the proposed methods of forming composite sections is that when a cementing medium is applied to the tongue and groove either a snug fit is not obtained or the cement present in excess extrudes between the joints causing an unsightly appearance and endangering the perfection of the finish by the possibility of some component of the adhesive bleeding into the finishing material. If the adhesive used is a water soluble material, such as glue, under conditions of excess humidity, swelling may occur causing undue expansion of the sections and even breakage at the joints.

Another method heretofore proposed was the production of preformed flooring in which wooden tiles are adhered, face down, in spaced relation to each other, to a flexible temporary backing, after which the spaces are filled with an elastic cement in a plastic condition and the backing removed after the cement has set.

It is obvious that the cement is not only of substantial thickness, but that it also extends therethrough from the lower to the upper surfaces, and since the characteristics of the wood and the rubber are different, pre-finishing of the wood sections would be necessary. This is especially true in view of the fact that finishes ordinarily employed for wood flooring are not satisfactory for rubber surfaces as the latter are flexible and deformable and often contain ingredients which contaminate the finish.

The present invention avoids the use of any method which will result in a composite structure having the individual members separated by a continuous sheet of cementing material throughout the joints. Such a result would be undesirable for the reasons before stated.

Figure 1:
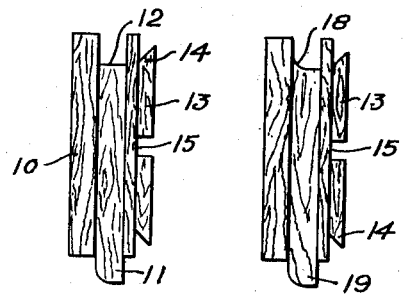
Figure 1 is an end elevation of a typical flooring slat.

In the present invention a new and improved result is accomplished, which eliminates the difficulties and disadvantages of prior methods in the following manner:

Referring to Figure 1, the numeral 10 denotes a short slat of flooring having a rounded tongue 11 formed along one side and a square groove 12 formed along the other side and also along one or both of the ends. The bottom side of the slat may be formed with an extended portion 13 having angularly undercut edges 14 and one or more grooves 15, this form of bottom being adapted to be firmly engaged by a plastic material in laying the floor as hereinafter described.

Figure 4:
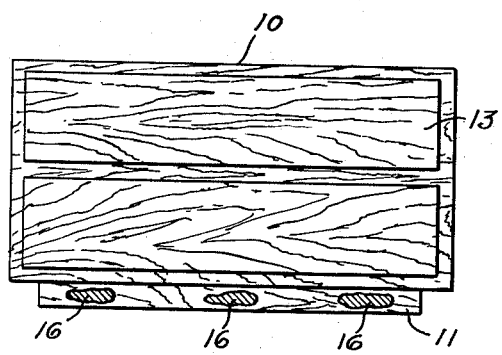
Figure 4 is a bottom view of a slat illustrating application of the spots of adhesive to the tongue.

In forming a composite section or block of slats such as those shown in Figure 1, instead of applying adhesive throughout the entire tongue and groove joint, the joint may be made by means of small individual spots of flexible adhesive 16, preferably applied to the flat bottom side of the tongue 11 as shown in Figure 4. When slats spotted in this manner are fitted together in tongue and groove relation, the flexible adhesive effect is limited to the lower side of the tongue and groove. Any extrusion of adhesive which may occur takes place at the bottom of the composite section where it cannot interfere with the fit or finish of the composite, and yet each joint forms a flexible hinge.

Figure 2:
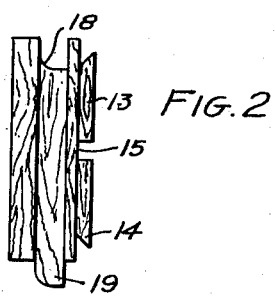
Figure 2 is an end elevation of an improved type of slat.
Figure 3:
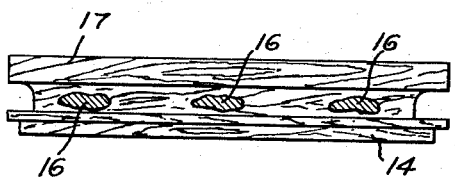
Figure 3 is an edgewise view of a slat illustrating the application of spots of adhesive to the groove.

Figure 2 shows an improved form of strip 17 in which the groove 18 is partially rounded to approximately the same contour as the tongue 19. In carrying out my method with this type of slat, the adhesive spots 16 are applied to the bottom of the groove 18 as shown in Figure 3. When the tongue 19 of a mating slat is entered firmly in the groove 18 the adhesive flows readily along under the tongue and particularly toward the lower corner thereof, giving the greatest hinge effect with a minimum of adhesive.

In carrying out the invention, it is preferred to apply the adhesive to the strips when they are in a position that will cause the surface tension of the adhesive to hold the spot in position until the tongue is entered. With the type shown in Figure 4, the spots are applied with the strip in a horizontal position with the back face up. With the type shown in Figure 3, the spots are applied with the strip in the vertical position, the groove being up and the tongue down. Any other positions of the respective types of strips would cause the spots to run by gravity unless the adhesive is used in a very viscous form which is undesirable.

In spotting the strips the frequency of the spots of adhesive must necessarily be regulated by the length of the strip, the viscosity of the adhesive, and the clearance between the tongue and the bottom of the channel. In all cases, regardless of the number of spots applied to any particular length of strip, it is preferred to keep the spots near the ends of pieces far enough away to avoid extrusion of the adhesive. The intermediate spots are spaced to allow sufficient flow of the adhesive material to follow along the tip of the tongue instead of up the sides. This result is best accomplished if the spots do not unite when the tongue is fully entered into the channel.

As an adhesive for use in producing the composite blocks by the new method described, it has been found that aqueous dispersions of tube or tire reclaim or rubber latex compounds give the best results. Rubber cements may be used as well as other solvent solutions of flexible adhesive materials such as nitrocellulose and various synthetic resins. Even thermo plastic materials such as non-hardening synthetics may be used, although in this case it is necessary to apply them at temperatures above that used for other materials. The preference for aqueous dispersions of rubber arises from the fact that the dried out films are inherently elastic and adhesive. The use of water emulsions of rubber permits carrying a very high solid content, even as high as 70% without attaining any substantial viscosity which would retard the flow. Another reason for preferring aqueous dispersions of rubber is that by their use fire hazards are eliminated, a very important consideration in factories producing wood flooring strips.

Due to the more or less temporary nature of the effect desired in producing composite sections or blocks by the method described, the method is not limited to any particular rubber compound. Rosin soap dispersions of inner tube reclaim work very well. Good results have also been achieved with commercial 60% latex as well as 70% latex known as Revertex. Vulcanizing ingredients are not necessary although they can be added. In cases where commercial latex products are used which do not penetrate well, it has been found that the addition of about .2% of Tergitol as a wetting agent promotes better adhesion. The main qualifications desired in the adhesive are good adhesive qualities, sufficient elasticity to allow recovery when the composite block is flexed, and enough durability to withstand atmospheric changes during the interval between the manufacture of the block and its use as a flooring unit.

Figure 5:
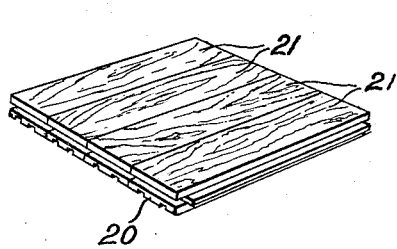
Figure 5 is a perspective view of a typical composite block or section.
Figure 6:
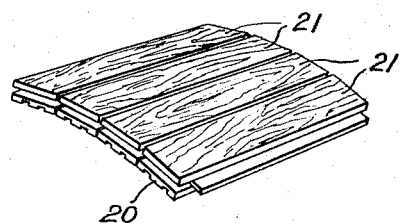
Figure 6 is a similar view showing the block bent to illustrate the flexibility of the hinged structure.

By the foregoing method of fabrication, composite blocks of various shapes and forms can be made, depending on the type of flooring pattern in which they are to be used, and while it is desirable for most purposes that the slats have the bottom extension 13 shaped as shown in Figures 1 and 2, it will be understood that the invention is not limited to this precise shape of slat. For example, Figure 5 illustrates a composite block of square shape, composed of slats 21 having grooved flat bottoms 20. Such a block being fabricated by the spot adhesive method as illustrated in Figure 3 or as in Figure 4, may be readily flexed as shown in Figure 6, allowing for shipment without breakage, for ease of handling, and proper laying under a variety of conditions encountered, the resilience of the adhesive spots permitting the unit to return to shape for accurate fitting.

The present application relates to a product which may be produced in any suitable manner, for example by means of mechanism disclosed in application Serial No. 254,989 filed February 7, 1939, which is a division of the present application.

An example of the manner of using the product, which is the subject-matter of the present application, is disclosed in application Serial No. 254,998 filed February 7, 1939, which is also a division of the present application.

While the invention has been set forth in preferred form throughout, its practice is not limited to the precise structures, compositions and procedures set forth, as various modifications may be made without departing from the scope of the appended claims.

I claim:

1. In a parquet flooring block, a plurality of tongued and grooved slats secured together in tongue and groove relation, the adjacent edges of said slats above said tongues and grooves comprising zones in which said slats may abut each other, and a film of permanently resilient adhesive flexibly securing said slats together, said film lying in spaces between said slats below the lower extremities of said zones.

2. As a product of manufacture, a unit including a plurality of tongued and grooved slats joined together in tongue and groove relation, and a film of permanently resilient adhesive between adjacent surfaces of said tongues and grooves for resiliently securing said slats together, clearance being provided between said last-mentioned surfaces to contain said film, thereby permitting the adjacent edge surfaces of said slats above said tongues and grooves to abut each other and isolate said film from the upper or finish surfaces of said slats.

3. In a parquet flooring block, in combination, a plurality of tongued and grooved slats joined together in tongue and groove relation, a series of pellicular spots of permanently resilient adhesive longitudinally disposed between the adjacent surfaces of said tongues and grooves securing said slats together, clearance being provided between the surfaces of said tongues and grooves to contain said spots and permit the adjacent edges of said slats above said tongues and grooves to abut each other, said spots forming hinge connections between said slats in zones remote from the upper surfaces thereof.

4. In a parquet flooring block, in combination, a plurality of slats having interlocking tongues and grooves, said tongues and grooves being so proportioned as to form clearance spaces therebetween with the adjacent edges of said slats abutting each other, and a series of spaced adhesive spots of an aqueous dispersion of rubber lying within said clearance spaces and adhering to said tongues and grooves to form resilient hinges between said slats isolated from the upper surfaces of said blocks by said abutting edges, said tongues and grooves having a sufficiently loose fit to permit of relative movement of said slats on said hinges.

5. A fabricated composite flooring section of tongue and groove slats in which clearances are provided between the surfaces of the tongues and grooves, thereby permitting the sides of said sections above said tongues and grooves to abut each other, and in which a series of spots of an aqueous dispersion of rubber is applied to the apexes of said tongues on a plurality of unconnected slats, whereby after said slats are joined in tongue and groove relationship in a predetermined pattern and said dispersion is allowed to set conjointly adhering to surfaces of said tongues and grooves, resilient hinge-joints are formed between said slats, said spots being isolated from the upper or finish surface of said section by said abutting side surfaces, said tongues and grooves having a sufficiently loose fit to permit of relative movement of said slats on said hinges.

6. As an article of manufacture, a fabricated composite flooring section of slats having interlocking edges within which spaced spots of permanently resilient adhesive are disposed in spaced relation to the upper surfaces of said sections and allowed to set, thereby hingedly joining said slats to form said section, sufficient clearances being provided between the adjacent surfaces of said interlocking edges to contain said adhesive and prevent it from spreading to the upper external surface of said section and to permit relative movement of said interlocking edges on said spots.

ARTHUR KLAMMT.